United States Patent
Kim et al.

(10) Patent No.: US 8,797,469 B2
(45) Date of Patent: Aug. 5, 2014

(54) STEREOSCOPIC IMAGE DISPLAY DEVICE

(75) Inventors: Sung-Woo Kim, Paju-si (KR); Byung-Joo Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 77 days.

(21) Appl. No.: 13/185,304

(22) Filed: Jul. 18, 2011

(65) Prior Publication Data

US 2012/0026416 A1  Feb. 2, 2012

(30) Foreign Application Priority Data

Jul. 28, 2010 (KR) ........................ 10-2010-0072905

(51) Int. Cl.
| G02F 1/1335 | (2006.01) |
| G02B 27/22 | (2006.01) |
| G02B 27/26 | (2006.01) |
| H04N 13/04 | (2006.01) |

(52) U.S. Cl.
USPC ................ 349/15; 359/465; 359/462; 348/51

(58) Field of Classification Search
USPC .................. 349/15, 96; 359/465, 462; 348/51
See application file for complete search history.

(56) References Cited

U.S. PATENT DOCUMENTS

| 6,025,897 | A  * | 2/2000  | Weber et al. ..................... 349/96 |
| 6,049,424 | A  * | 4/2000  | Hamagishi ....................... 359/464 |
| 6,661,483 | B1 * | 12/2003 | Moriwaki et al. ............. 349/102 |
| 7,236,286 | B2 * | 6/2007  | Clikeman et al. ............. 359/247 |
| 7,286,197 | B2 * | 10/2007 | Kwon et al. ................... 349/112 |
| 7,342,721 | B2 * | 3/2008  | Lukyanitsa ................... 359/462 |
| 7,522,340 | B2 * | 4/2009  | Kim et al. ................. 359/489.14 |
| 7,567,307 | B2 * | 7/2009  | Kim et al. ........................ 349/15 |
| 7,602,466 | B2 * | 10/2009 | Kang ............................. 349/141 |
| 7,995,153 | B2 * | 8/2011  | Chang ............................. 349/15 |
| 8,045,087 | B2 * | 10/2011 | Hwang et al. ................... 349/58 |
| 8,262,271 | B2 * | 9/2012  | Tillin et al. .................... 362/606 |
| 8,274,554 | B2 * | 9/2012  | Nakamura ....................... 348/51 |
| 8,294,753 | B2 * | 10/2012 | Jeong et al. ..................... 348/59 |
| 8,305,515 | B2 * | 11/2012 | Jeong et al. ..................... 349/61 |
| 2004/0085496 | A1 * | 5/2004  | Paukshto et al. ............. 349/106 |
| 2006/0215262 | A1 * | 9/2006  | Kim ............................. 359/465 |
| 2007/0242028 | A1 * | 10/2007 | Kitagawa et al. ............. 345/100 |

(Continued)

FOREIGN PATENT DOCUMENTS

| CN | 101059619 A | 10/2007 |
| CN | 101216607 A | 7/2008 |
| CN | 101729917 A | 6/2010 |

OTHER PUBLICATIONS

Office Action issued in corresponding Chinese Patent Application No. 201110226290.8, mailed Jun. 5, 2013, 13 pages.

(Continued)

*Primary Examiner* — Michael Caley
*Assistant Examiner* — Jia Pan
(74) *Attorney, Agent, or Firm* — Brinks Gilson & Lione

(57) ABSTRACT

The present invention is for a stereoscopic image display device to achieve enhanced brightness during 3D image display using a switchable barrier and brightness enhancement polarizing films, the stereoscopic image display device includes a backlight unit to transmit light upward, a barrier cell located on the backlight unit, the barrier cell functioning as a barrier when voltage is applied thereto and a transparent cell when voltage is not applied thereto, a first brightness enhancement polarizing film attached to an upper surface of the barrier cell, and an image panel located on the first brightness enhancement polarizing film.

11 Claims, 2 Drawing Sheets

(56) References Cited

U.S. PATENT DOCUMENTS

| | | |
|---|---|---|
| 2008/0165296 A1* | 7/2008 | Kim et al. ........................ 349/15 |
| 2008/0204874 A1* | 8/2008 | Kim et al. ...................... 359/465 |
| 2009/0033837 A1* | 2/2009 | Molsen et al. ................... 349/96 |
| 2010/0007716 A1* | 1/2010 | Lee et al. ......................... 348/43 |
| 2010/0097449 A1* | 4/2010 | Jeong et al. ...................... 348/59 |

OTHER PUBLICATIONS

Search Report issued in corresponding Chinese Patent Application No. 201110226290.8, mailed Jun. 5, 2013, 4 pages.

* cited by examiner

STEREOSCOPIC IMAGE DISPLAY DEVICE

Pursuant to 35 U.S.C. §119(a), this application claims the benefit of earlier filing date and right of priority to Korean Application 10-2010-0072905, filed on Jul. 28, 2010, the content of which is incorporated by reference herein in its entirety.

BACKGROUND

1. Field of the Invention

The present disclosure relates to a display device, and more particularly, to a stereoscopic image display device to achieve enhanced brightness during 3D image display using a switchable barrier and brightness enhancement polarizing films.

2. Discussion of the Related Art

At present, services for rapid dissemination of information, to be constructed based on high-speed information communication networks, have developed from a simple "listening and speaking" service, such as current telephones, to a "watching and listening" multimedia type service based on digital terminals used for high-speed processing of characters, voices and images, and are expected to be ultimately developed into hyperspace 3-dimensional stereoscopic information communication services enabling virtual reality and stereoscopic viewing free from the restrains of time and space.

In general, stereoscopic images representing 3-dimensions are realized based on the principle of stereo-vision via the viewer's eyes. However, since the viewer's eyes are spaced apart from each other by about 65 mm, i.e. have a binocular parallax, the left and right eyes perceive slightly different images due to a positional difference between the two eyes. Such an image difference due to the positional difference between the two eyes is called binocular disparity. A 3-dimensional stereoscopic image display device is designed based on binocular disparity, allowing the left eye to view only an image for the left eye and the right eye to view only an image for the right eye.

Specifically, the left and right eyes view different 2-dimensional images, respectively. If the two different images are transmitted to the brain through the retina, the brain accurately combines the images, reproducing depth perception and realism of an original 3-dimensional (3D) image. This ability is conventionally referred to as stereography (stereoscopy), and a display device to which stereoscopy is applied is referred to as a stereoscopic display device.

Stereoscopic display devices may be classified based on constituent elements to realize a 3-dimensional (3D) image. In one example, stereoscopic display devices are classified into a glasses-type stereoscopic display device in which shutter glasses allow a target eye to catch an image and prevent a non-target eye from catching the image, allowing both the eyes to selectively catch different images, and a non-glasses type stereoscopic display device using a lens or barrier.

Examples of non-glasses type stereoscopic devices include an electrically-driven liquid crystal lens type stereoscopic display device, which achieves lens effects by creating an optical path difference based on an electrode pattern difference between regions when voltage is applied, and a barrier type stereoscopic display device which separately transmits a left-eye image and a right-eye image via slits between barriers.

However, a conventional barrier type stereoscopic display device has deterioration in opening rate and brightness due to a barrier pattern.

This problem of the conventional barrier type stereoscopic display device will now be described in detail.

If a region in which the barrier pattern is located includes a reflective metal pattern, the reflective metal pattern may intercept light directed from therebelow, causing deterioration in opening rate and brightness.

A switchable barrier may be used to prevent deterioration in opening rate and brightness. The switchable barrier functions to completely transmit light directed from therebelow during 2D image display, but is divided into black and white regions such that only the white region transmits light during 3D image display. Thus, when displaying a 3D image using a switchable barrier type stereoscopic display device, the black region functions as a barrier pattern, causing considerable brightness deterioration.

BRIEF SUMMARY

A stereoscopic image display device includes a backlight unit to transmit light upward, a barrier cell located on the backlight unit, the barrier cell functioning as a barrier when voltage is applied thereto and a transparent cell when voltage is not applied thereto, a first brightness enhancement polarizing film attached to an upper surface of the barrier cell, and an image panel located on the first brightness enhancement polarizing film.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE DRAWINGS AND THE PRESENTLY PREFERRED EMBODIMENTS

Reference will now be made in detail to a stereoscopic display device according to the preferred embodiments of the present invention, examples of which are illustrated in the accompanying drawings. Wherever possible, the same reference numbers will be used throughout the drawings to refer to the same or like parts.

Hereinafter, a stereoscopic image display device according to the present invention will be described in detail with reference to the accompanying drawings.

Figure 1:
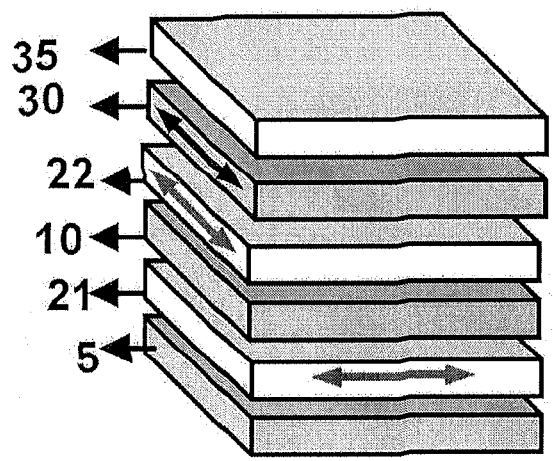
FIG. 1 is a perspective view illustrating a switchable barrier type stereoscopic image display device.

FIG. 1 is a perspective view illustrating a switchable barrier type stereoscopic image display device.

The switchable barrier type stereoscopic image display device is selectively operated according to voltage application. The switchable barrier type stereoscopic image display device employs a barrier cell, which selectively functions as a barrier only when voltage is applied thereto. When voltage is not applied to the barrier cell, the barrier cell directly transmits incident light from therebelow, which can reduce deterioration in brightness during 2D image display.

Considering a configuration of the swithchable barrier type stereoscopic image display device, as illustrated in FIG. 1, a backlight unit 5, a first polarizing plate 21, an image panel 10, a second polarizing plate 22, a barrier cell 30 and a third polarizing plate 35 are sequentially stacked in the named order from bottom to top.

The image panel 10 is a light reception type panel, such as a liquid crystal panel, to receive light from the backlight unit 5 therebelow and transmit the light upward. Transmission axes of the first and second polarizing plates 21 and 22 are defined by an optical axis of light emitted from the image panel 10. In the drawing, the transmission axes of the first and second polarizing plates 21 and 22 are illustrated as crossing each other.

A part of the barrier cell 30 functions not as a barrier but as a slit when voltage is applied, thus serving to separately transmit a left-eye image and a right-eye image from the image panel 10 therebelow.

A transmission axis of the third polarizing plate 35 is defined by an optical axis of light emitted from the barrier cell 30.

The above-described switchable barrier type stereoscopic image display device uses a barrier during 3D image display, causing greater deterioration in brightness during 3D image display than during 2D image display. Thus, the stereoscopic image display device may suffer from deterioration in brightness during 3D image display.

Hereinafter, a configuration to prevent deterioration in brightness of the switchable barrier type stereoscopic image display device will be described.

Figure 2:
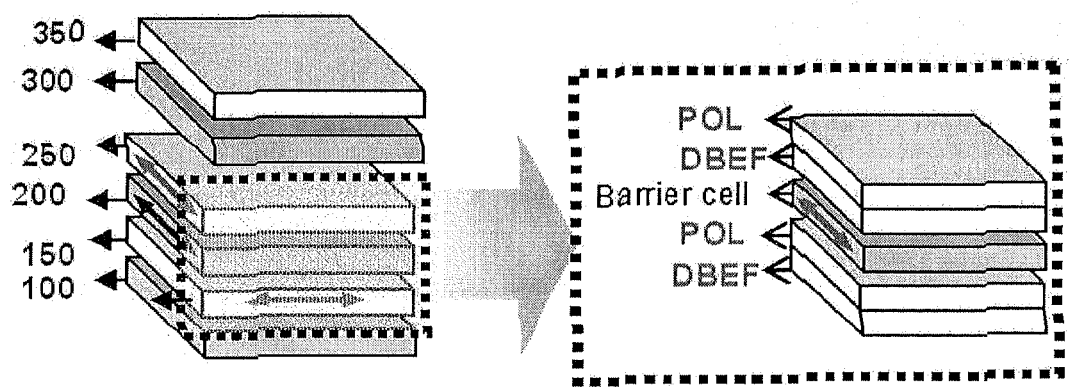
FIG. 2 is a perspective view illustrating a stereoscopic image display device according to an embodiment of the present invention.

FIG. 2 is a perspective view illustrating a stereoscopic image display device according to the present invention.

As illustrated in FIG. 2, the stereoscopic image display device according to the present invention includes a backlight unit 100 to emit light upward, a barrier cell 200 located on the backlight unit 100, a first brightness enhancement polarizing film 250 attached to an upper surface of the barrier cell 200, an image panel 300 located on the first brightness enhancement polarizing film 250, and a polarizing plate 350 located on the image panel 300.

Here, the polarizing plate 350 may be omitted as occasion demands, but is preferably provided to prevent diffused reflection of external light.

The backlight unit 100 includes a light source, an optical sheet on the light source, and a lower structure on which the light source and the optical sheet are arranged.

For example, the light source may be a fluorescent lamp, Light Emitting Diodes (LEDs), or the like. A plurality of light sources may be arranged below the barrier cell 200, or one or two light sources may be selectively formed below one or two edges of the barrier cell 200. In the former case, a plurality of fluorescent lamps may be arranged in a line parallel to one another or a plurality of LEDs may be arranged in a matrix form. In the latter case, the fluorescent lamp(s) or one or two rows of LEDs may be arranged on a single edge or opposite edges.

The optical sheet includes a light guide plate, a diffusion plate, a prism sheet, a reflective sheet, or the like. The optical sheet serves to guide light transmitted from the light source therebelow, realizing emission of light without light loss.

As occasion demands, to further enhance brightness, a second brightness enhancement polarizing film 150 is preferably provided between the backlight unit 100 and the barrier cell 200. Of course, the second brightness enhancement polarizing film 150 may be omitted and be replaced by the optical sheet, such as the reflective sheet or the diffusion sheet, included in the backlight unit 100.

The first and second brightness enhancement polarizing films 250 and 150 serve as Double Brightness Enhancement Film Polarizer (DBEF-P), one surface of which defines a double brightness enhancement film (DBEF) having a reflection function and the other surface of which defines a polarizer layer (POL). Thus, the DBEF reflects incident light transmitted from a facing constituent element to enable utilization of light, and the POL serves to transmit light of a specific transmission axis having passed through the DBEF. That is, the POL is divided into a light transmission region and a light reflection region except for the light transmission region.

Preferably, a surface of the backlight unit 100 facing the second brightness enhancement polarizing film 150 is provided with a reflective sheet. This allows light to be reflected from both the second brightness enhancement polarizing film 150 and the backlight unit 100.

The first brightness enhancement polarizing film 250 takes the form of a stack of the DBEF facing the barrier cell 200 and the POL facing the image panel 300. The second brightness enhancement polarizing film 150 takes the form of a stack of the DBEF facing the backlight unit 100 and the POL facing the barrier cell 200. In the first and second brightness enhancement polarizing films 250 and 150, the DBEF is typically made of a diffusive material having a reflection function.

The first brightness enhancement polarizing film 250 and the second brightness enhancement polarizing film 150 have perpendicular transmission axes.

The barrier cell 200 may be driven in any one of a Twisted Nematic (TN) mode, an Electrically Controlled Birefringence (ECB) mode and Optically Compensated Birefringence (OCB) mode when voltage is applied thereto.

The image panel 300 is a light reception type display panel including a light source. A representative example of which may be a liquid crystal panel. Assuming that the image panel 300 is a liquid crystal panel, the polarizing plate 350 is provided on the image panel 300.

An interior configuration of the barrier cell 200 will be described later. An optical path of the stereoscopic image display device according to the present invention will now be described.

Figure 3:
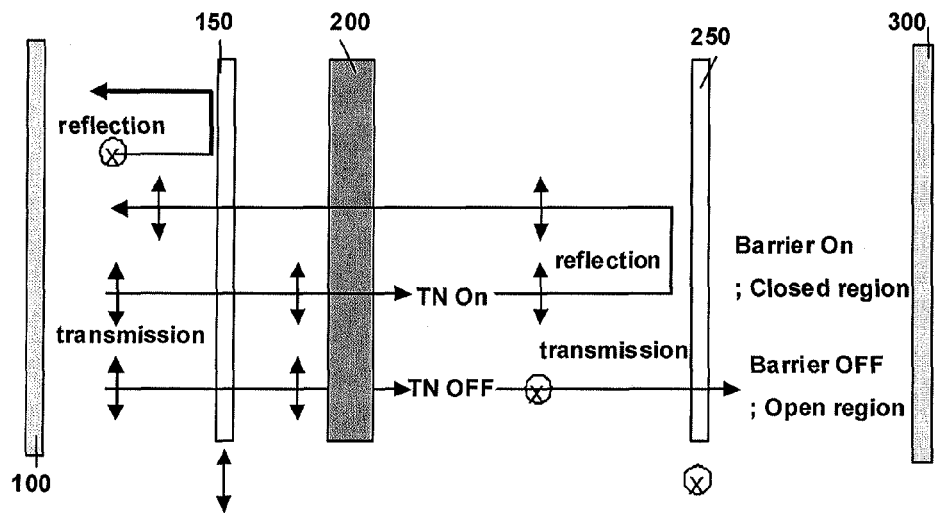
FIG. 3 is a view illustrating an optical axis on a per layer basis of the stereoscopic image display device according to an embodiment of the present invention.

FIG. 3 is a view illustrating an optical axis on a per layer basis of the stereoscopic image display device according to the present invention.

Referring to FIG. 3, when the backlight unit 100 is turned on, light emitted from the backlight unit 100 reaches the second brightness enhancement polarizing film 150 having a first transmission axis and thus, light having the first transmission axis is transmitted to the barrier cell 200. In this case, a part of the second brightness enhancement polarizing film 150, excluding the first transmission axis, reflects the light toward the backlight unit 100, and the reflective sheet provided on the surface of the backlight unit 100 reflects the light upward, which enables recycling of the light.

Now, transmission of light through the barrier cell 200 will be described according to On/Off operations of the barrier cell 200.

When voltage is applied to the barrier cell 200 (On operation), the barrier cell 200 only transmits the light of the first transmission axis having passed through the second brightness enhancement polarizing film 150. Thus, the light cannot pass through the first brightness enhancement polarizing film 250 having a second transmission axis perpendicular to the first transmission axis and is reflected from the first brightness enhancement polarizing film 250. In this case, the reflected light is introduced into the surface of the backlight unit 110 by passing through the barrier cell 200 and the second brightness enhancement polarizing film 150 having the first transmission axis and is reflected from the backlight unit 100, which enables recycling of light.

When voltage is not applied to the barrier cell 200 (Off operation), a liquid crystal layer of the barrier cell 200 directly transmits light toward the first brightness enhancement polarizing film 250 thereabove, allowing light having the second transmission axis to be transmitted to the image panel 300 through the first brightness enhancement polarizing film 250. That is, in the Off operation of the barrier cell 200, light can be transmitted upward without absorption by any constituent element, which realizes light transmission substantially free from brightness deterioration.

Here, when voltage is applied to the barrier cell 200, a partial region of the barrier cell 200, light having passed through which is reflected from the first brightness enhancement polarizing film 250, functions as a barrier. That is, the entire barrier cell 200 is not designed as a barrier, and a partial region of the barrier cell 200 is designed as a barrier and the remaining region is designed as a slit. In this case, the barrier cell is divided into black and white regions driven separately. The white region directly transmits light, and the black region enables continuous repeated reflection owing to the presence of the first and second brightness enhancement polarizing films 250 and 150, which allows non-transmitted light to be repeatedly reflected, preventing brightness deterioration.

The divided black and white regions of the barrier cell will now be described in detail.

Figure 4:
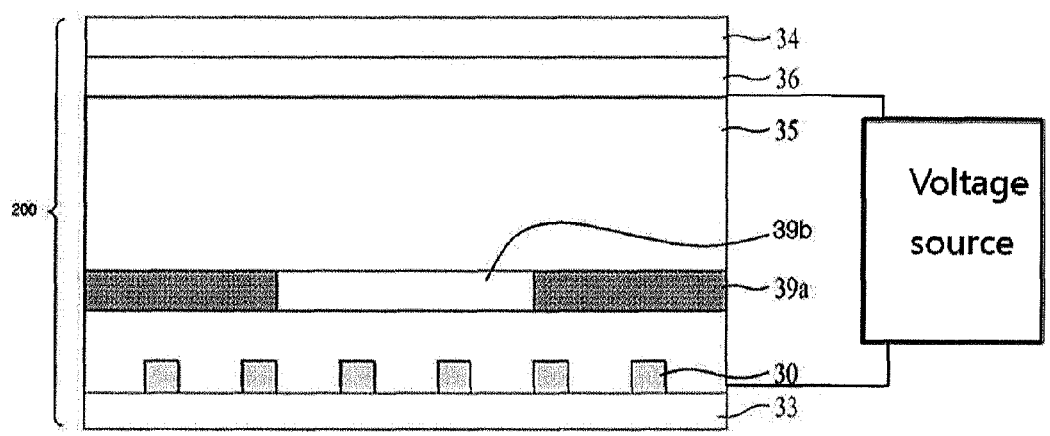
FIG. 4 is a sectional view illustrating a configuration of a barrier cell of the stereoscopic image display device according to an embodiment of the present invention.

FIG. 4 is a sectional view illustrating the barrier cell of the stereoscopic image display device according to the present invention.

As illustrated in FIG. 4, the barrier cell 200 includes first and second substrates 33 and 34 facing each other, a plurality of first electrodes 30 formed on the first substrate 33 and spaced apart from one another, a second electrode 36 formed at the entire surface of the second substrate 34, and a liquid crystal layer 35 formed between the first and second substrates 33 and 34.

The barrier cell 200 further includes a voltage source (not shown) to apply voltage to the first electrodes 30 and the second electrode 36 such that a black region 39a and a white region 39b are created and driven separately upon receiving the voltage. The voltage source is connected to the first electrodes 30 and the second electrode 36.

The plurality of first electrodes 30 is elongated in a given direction and extends parallel to one another. For example, the first electrodes 30 have a bar shape. As occasion demands, the first electrodes 30 may be formed in a singe layer on the first substrate 33, or may be formed on the first substrate 33 alternately with an insulating film (not shown).

The first electrodes 30 may be arranged at the same distance or partially at different distances and also, may have the same width or partially have different widths.

The black region 39a is a region where liquid crystals of the liquid crystal layer 35 are oriented to transmit only the light having the first transmission axis when voltage is applied, thus preventing light from passing through the first brightness enhancement polarizing film 250. The white region 39b is a region where liquid crystals of the liquid crystal layer 35 are oriented to transmit the light having the second transmission axis of the first brightness enhancement polarizing film 250, thus allowing the light to be transmitted to the image panel 300 above the first brightness enhancement polarizing film 250.

The black region 39a and the white region 39b are defined by applying a threshold voltage or ground voltage (zero volts) to the second electrode 36, applying a voltage greater than the threshold voltage or ground voltage to the first electrodes 30 of the black region 39a, and applying the same voltage as the threshold voltage or ground voltage applied to the second electrode 36 to the first electrodes 30 of the white region 39b.

Areas of the black and white regions 39a and 39b may be determined according to pixels of the image panel 300. The plurality of electrodes 30 may be bundled such that one white region 39b and neighboring black regions 39a constitute a pitch and a plurality of pitches is repeated.

Hereinafter, an experiment to estimate a brightness enhancement degree of the stereoscopic image display device according to the present invention will be described.

TABLE 1

| Measurement No Condition | Backlight Brightness | Barrier cell Off(2D) | Barrier cell On(3D) | Brightness Rate of 3D/2D | Ref |
|---|---|---|---|---|---|
| 1 POL(upper)/ POL(lower) | 6050 | 3290 | 895 | 27.20% | |
| 2 POL(upper)/ DBEF-P(lower) | 6160 | 3910 | 1059 | 27.08% | |
| 3 DBEF-P(upper)/ DBEF-P(lower) | 6040 | 3840 | 1310 | 34.11% | |

As represented in Table 1, the experimental results show that providing brightness enhancement polarizing film(s) adjacent to a backlight unit (Nos. 2 and 3) achieves greater brightness than providing only polarizing plates P above and below a barrier cell (No. 1).

In the above experiment to estimate the brightness of the respective cases, the backlight unit is subjected to aging for 30 minutes or more.

In addition, it will be appreciated that providing the brightness enhancement polarizing films respectively above and below the barrier cell (No. 3) achieves less brightness difference between a 2D image and a 3D image than providing the brightness enhancement polarizing film only below the barrier cell. That is, brightness rate of 3D/2D of the case No. 2 is 27.08%, but brightness rate of 3D/2D of the case No. 3 is 34.11% and thus, it will be appreciated that a brightness difference between a 2D image and a 3D image sensed by a viewer is reduced, enabling high definition viewing.

As described above, it will be appreciated that providing brightness enhancement polarizing films respectively above and below the barrier cell can achieve brightness enhanced by about 26% or more above a reference value (the case No. 1) without increase in power consumption. In other words, as compared to the conventional configuration in which polarizing plates are arranged to face each other, the configuration of the present invention can achieve enhanced brightness of a 3D image and at least can reduce a brightness difference between a 2D image and a 3D image, resulting in high-quality display.

Additionally, the barrier cell 200 may include alignment films (not shown) to cover the first and second electrodes 30 and 36 of the first and second substrates 33 and 34. In this case, rubbing condition of the alignment films may be defined considering aberration of axes between the DBEF and POL in the second brightness enhancement polarizing film 150. It is preferable that the axis of DBEF is coincided with the axis of POL in the second brightness enhancement polarizing film 150.

As is apparent from the above description, a stereoscopic image display device according to the present invention has the following effects.

As a result of locating a switchable barrier cell below a display panel and selectively applying voltage to the barrier cell such that voltage is applied during 3D image display and is not applied during 2D image display, the barrier cell can function as a transmission cell to directly transmit light during 2D image display, which can prevent deterioration in opening rate and brightness during 2D image display.

Further, to prevent deterioration in brightness due to a barrier during 3D image display, a brightness enhancement polarizing film is at least located on the barrier cell, to reflect light transmitted therebelow from a partial region of the barrier cell excluding a transmission axis, which enables recycling of the light and achieves enhanced brightness. As a result, a brightness difference between 2D image display and 3D image display can be reduced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A stereoscopic image display device comprising:
a backlight unit to transmit light upward;
a barrier cell located on the backlight unit, the barrier cell functioning as a barrier by connecting to a voltage source when voltage is applied thereto and a transparent cell when voltage is not applied thereto;
a first brightness enhancement polarizing film attached to an upper surface of the barrier cell;
a second brightness enhancement polarizing film between the backlight unit and the barrier cell; and
an image panel located on the first brightness enhancement polarizing film,
wherein the first brightness enhancement polarizing film is comprised of a first brightness enhancement layer facing the barrier cell and a first polarizer layer facing the image panel, and the first brightness enhancement layer and the first polarizer layer are contacting each other,
wherein the second brightness enhancement polarizing film is comprised of a second brightness enhancement layer facing the backlight unit and a second polarizer layer facing the barrier cell, and the second brightness enhancement layer and the second polarizer layer are contacting each other.

2. The device according to claim 1, wherein the first brightness enhancement layer and the second brightness enhancement layer have a reflection function, respectively.

3. The device according to claim 1, wherein the first brightness enhancement polarizing film and the second brightness enhancement polarizing film have perpendicular transmission axes.

4. The device according to claim 3, wherein the barrier cell includes:
first and second substrates facing each other;
a plurality of first electrodes formed on the first substrate and spaced apart from one another;
a second electrode formed on the entire surface of the second substrate; and
a liquid crystal layer formed between the first and second substrates.

5. The device according to claim 4, wherein the voltage source applies voltages to the first electrodes and the second electrode such that the barrier cell is divided into a black region and a white region when voltage is applied thereto.

6. The device according to claim 4, wherein the barrier cell is driven in any one of a Twisted Nematic (TN) mode, an Electrically Controlled Birefringence (ECB) mode and an Optically Compensated Birefringence (OCB) mode.

7. The device according to claim 1, wherein the image panel comprises a light reception display panel.

8. The device according to claim 7, wherein the image panel comprises a liquid crystal panel.

9. The device according to claim 7, further comprising a polarizing plate on the image panel.

10. The device according to claim 1, further comprising a reflective sheet on a surface of the backlight unit facing the second brightness enhancement polarizing film.

11. The device according to claim 4, wherein the first and second substrates of the barrier cell are provided respectively with alignment films.

* * * * *